(12) United States Patent
Barthel et al.

(10) Patent No.: US 7,901,502 B2
(45) Date of Patent: Mar. 8, 2011

(54) DISPERSION WHICH CONTAINS AT LEAST 2 TYPES OF PARTICLES

(75) Inventors: Herbert Barthel, Emmerting (DE); Johann Doppelberger, Emmerting (DE); Mario Heinemann, Burghausen (DE); Torsten Gottschalk-Gaudig, Burghausen (DE); Stephan Loskot, Kastl (DE); Ute Voelkel, Burghausen (DE)

(73) Assignee: Wacker Chemie AG, Munich (DE)

( * ) Notice: Subject to any disclaimer, the term of this patent is extended or adjusted under 35 U.S.C. 154(b) by 167 days.

(21) Appl. No.: 11/011,303

(22) Filed: Dec. 14, 2004

(65) Prior Publication Data

US 2005/0133766 A1    Jun. 23, 2005

(30) Foreign Application Priority Data

Dec. 22, 2003   (DE) .................. 103 60 464

(51) Int. Cl.
  *C09D 1/00*    (2006.01)
  *C09D 7/12*    (2006.01)
(52) U.S. Cl. .............. 106/287.34; 106/286.8; 106/287.1; 106/287.17; 106/482
(58) Field of Classification Search .............. 106/286.8, 106/287.17, 482, 287.1, 287.34
  See application file for complete search history.

(56) References Cited

U.S. PATENT DOCUMENTS

| | | | |
|---|---|---|---|
| 5,134,100 A * | 7/1992 | Freudenberg et al. ........ 501/127 |
| 5,266,622 A | 11/1993 | Mazanek et al. | |
| 5,554,215 A | 9/1996 | Simpson et al. | |
| 6,284,819 B1 * | 9/2001 | Darsillo et al. .................. 524/22 |
| 6,420,039 B1 | 7/2002 | Field et al. | |
| 6,699,808 B1 * | 3/2004 | Schwertfeger et al. .......... 501/20 |
| 7,384,470 B2 * | 6/2008 | Binkle et al. ............... 106/286.8 |
| 2006/0163533 A1 | 7/2006 | Batz-Sohn et al. | |
| 2010/0071594 A1 * | 3/2010 | Schumacher et al. ..... 106/286.1 |
| 2010/0129645 A1 * | 5/2010 | Gensler et al. ................ 428/336 |

FOREIGN PATENT DOCUMENTS

| | | |
|---|---|---|
| CN | 1720147 A | 1/2006 |
| EP | 0 340 583 | 11/1989 |
| JP | 60-224580 A | 11/1985 |
| JP | 2-14095 A | 1/1990 |
| JP | 03-5353 A | 1/1991 |
| JP | 06-100701 A | 4/1994 |
| JP | 2002-526564 A | 8/2002 |
| JP | 2006-508882 A | 3/2006 |
| WO | WO 00/20221 | 4/2000 |
| WO | WO 01/17902 A1 | 3/2001 |
| WO | 2004/050377 A1 | 6/2004 |
| WO | WO 2004/050377 A1 * | 6/2004 |

OTHER PUBLICATIONS

English Abstract corresponding to JP 60-224580A.
English Abstract corresponding to JP 06-100701A.

* cited by examiner

*Primary Examiner* — David M Brunsman
(74) *Attorney, Agent, or Firm* — Brooks Kushman P.C.

(57) ABSTRACT

Aqueous dispersions contain at least two chemically different particle types having a diameter on average of less than 100 μm. The dispersions are resistant to sedimentation and gelling for long periods of time, and can be used for many purposes, such as the polishing of optical surfaces, and in paints and adhesives.

16 Claims, 2 Drawing Sheets

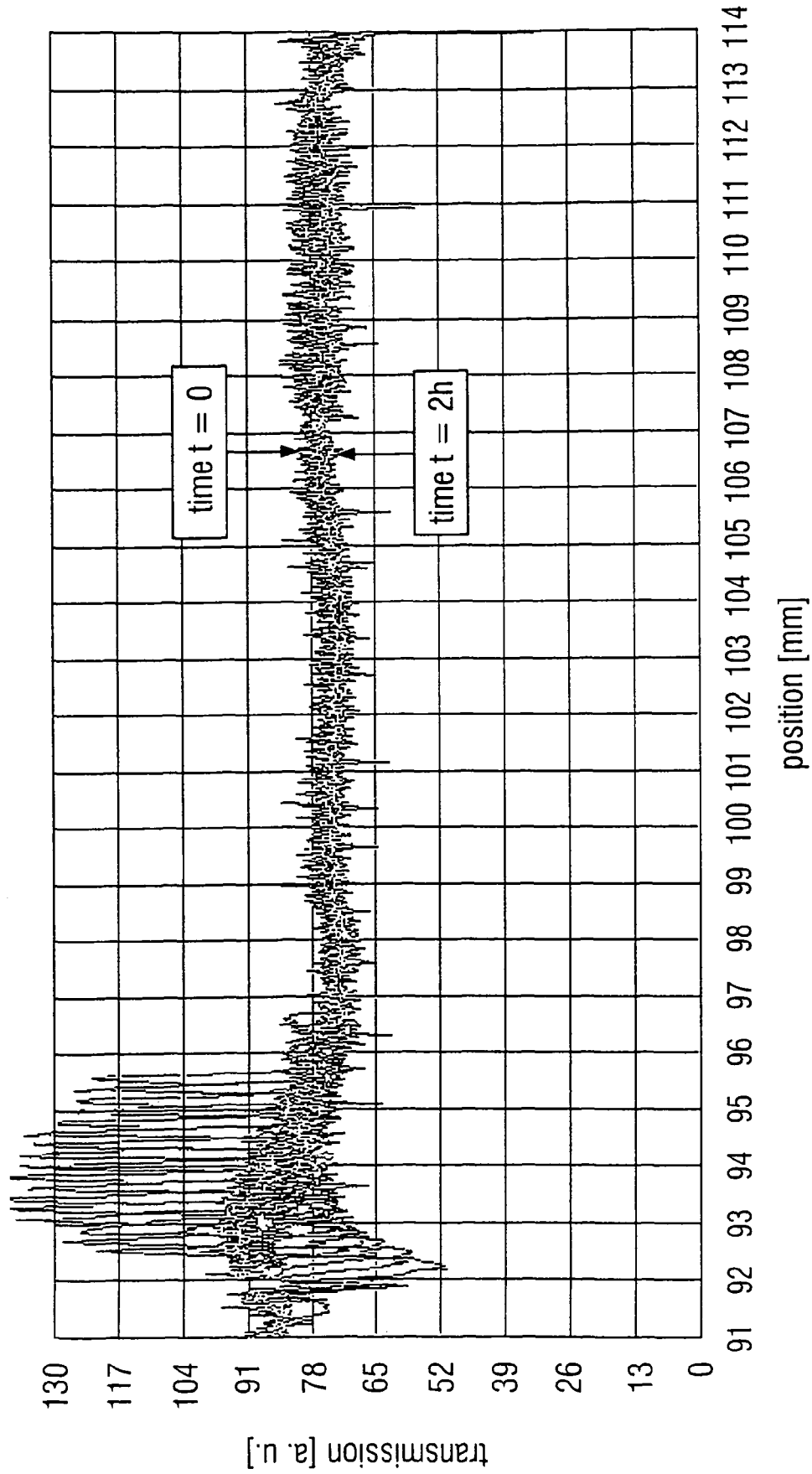

DISPERSION WHICH CONTAINS AT LEAST 2 TYPES OF PARTICLES

BACKGROUND OF THE INVENTION

1. Field of the Invention

The invention relates to a dispersion containing at least two types of particles, a process for preparing a dispersion and a method for stabilizing a dispersion.

2. Background Art

The stabilization of aqueous silicic acid dispersions with aluminum salts for use for the coating of print media, e.g. paper, is disclosed in the publication by Cabot, EP 1 124 693 A1. Cationic dispersions having a positive zeta potential are obtained. The high electrolyte content or salt content is disadvantageous.

Other known methods for stabilizing silicic acid dispersions are the addition of alkali and establishing of a high pH with KOH or NaOH. Here, the high electrolyte content or salt content and the alkalinity are disadvantageous.

SUMMARY OF THE INVENTION

It is an object of the invention to overcome the disadvantages of the prior art. This and other objects are achieved by this invention.

BRIEF DESCRIPTION OF THE DRAWINGS

FIG. 1 and FIG. 2 illustrate comparative stabilities of non-inventive and inventive dispersions, respectively, by a photocentrifuge (luminofuge) apparatus.

DETAILED DESCRIPTION OF THE PREFERRED EMBODIMENT(S)

Figure 1:
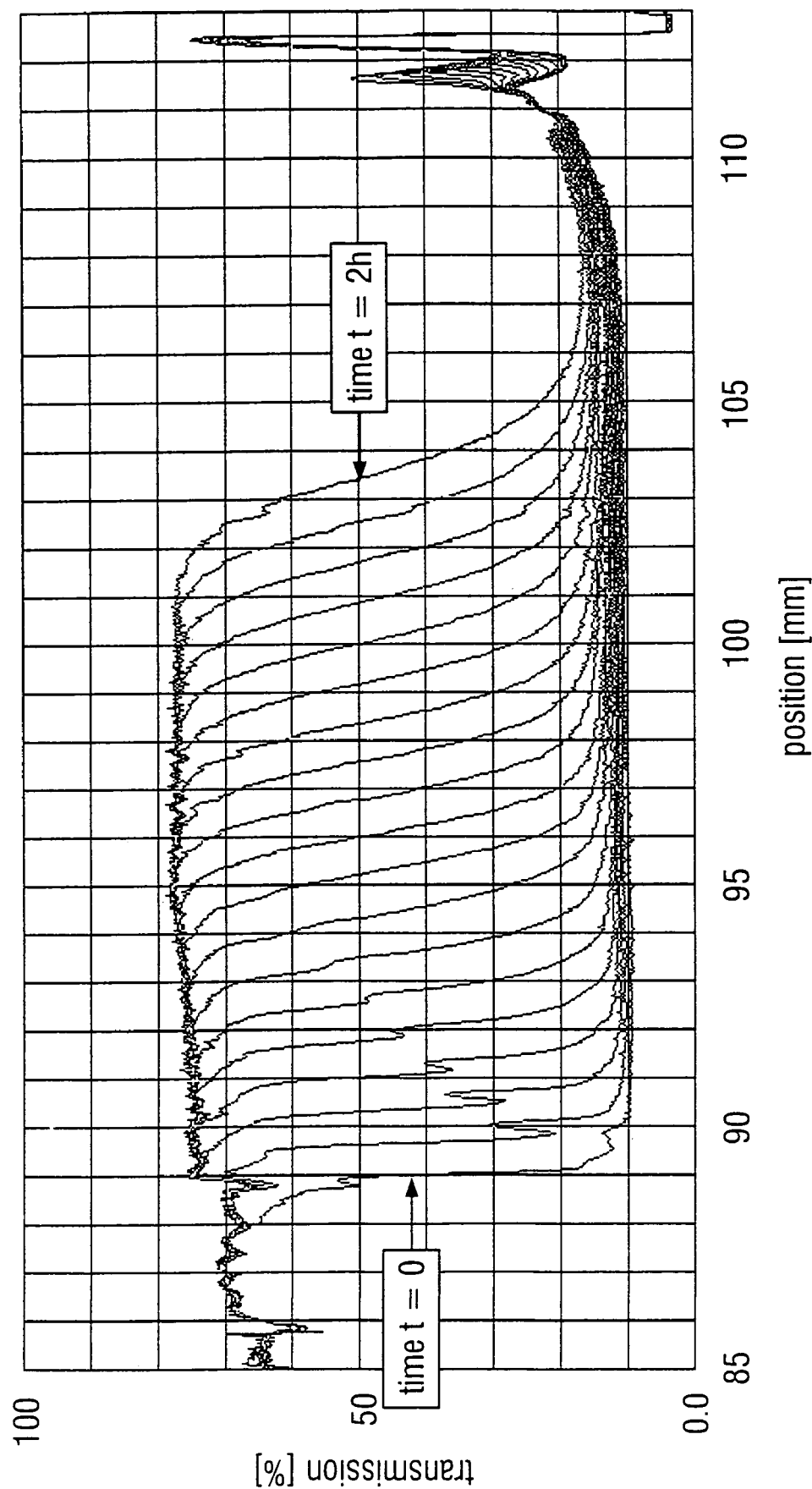

The invention relates to an aqueous dispersion, which contains at least two chemically different particle types having a mean diameter of less than 100 µm. Preferably, the particles belonging to these particle types have a mean diameter greater than 1 nm, more preferably from 1 nm to 100 µm, yet more preferably from 10 nm to 10 µm, still more preferably from 50 nm to 1000 nm, and in particular from 50 nm to 250 nm. The at least two chemically different particle types are solid particles at room temperature and atmospheric pressure, i.e. from 900 to 1100 hPa.

The particles are preferably insoluble or sparingly soluble in water. Preferably the particles have a solubility in water, at pH 7.33 and an electrolyte background of 0.11 mol/l and a temperature of 37° C., of less than 0.1 g/l, more preferably of less than 0.05 g/l, at atmospheric pressure, i.e. from 900 to 1100 hPa.

The particles preferably have a molar mass greater than 10,000 g/mol, more preferably a molar mass of from 50,000 to 100,000,000 g/mol, and in particular from 100,000 to 10,000,000 g/mol, preferably measured, in each case, by means of static light scattering. The particles preferably have a specific BET surface area of from 1 to 500 m$^2$/g, more preferably from 20 to 300 m$^2$/g. The BET surface area is measured by known methods, preferably according to German Industrial Standards DIN 66131 and DIN 66132.

The particles preferably have a carbon content of less than 50 percent by weight, and have different chemical compositions. The chemically different particles preferably differ in the elemental composition by more than 0.1% by weight, more preferably by greater than 0.5% by weight, yet more preferably by at least 1% by weight, still more preferably by 5% or more by weight, and most preferably by 25% or more by weight, of their chemical composition, measured as an elemental composition.

The particles preferably have a Mohs' hardness equal to or greater than 1, preferably a Mohs' hardness greater than 4.

In aqueous dispersion at the same pH, the particles have different ZETA potentials, measured as a single particle fraction, and have different isoelectric points, i.e. pH ranges in which the ZETA potential is zero, measured as a single particle type. In the case of the particles, at least the isoelectric points of two particle types preferably differ by at least half a pH unit. However, the difference between the isoelectric points of two chemically different particle types is preferably greater than 0.5 pH unit, more preferably greater than 1 pH unit, yet more preferably greater than 2.5 pH units, and most preferably greater than 4 pH units.

The dispersions may contain more than two particle types, preferably up to 10 particle types, more preferably up to 5 particle types, and most preferably 3 particle types, and are preferably be selected from organic resins such as silicone resins, e.g. methylsilicone resins; epoxy resins; acrylic resins, e.g. polymethyl methacrylates; and polymers such as polyolefins, e.g. polystyrene; metal colloids, e.g. silver colloids; and metal oxides, e.g. oxides of main group III such as aluminum oxides, of main group IV such as silicon dioxide or germanium oxide, and main group V, and, for example, oxides of the subgroup metals, such as titanium(IV) dioxides zirconium(IV) oxides, zinc oxides, and, for example, oxides of the lanthanides such as cerium(IV) oxides; and any desired mixtures of these oxides such as silicon dioxide-aluminum oxide mixed oxides having any desired composition, preferably having a content of from 20 to 100% by weight of silicon dioxide, silicon dioxide-iron(III) oxide mixed oxides having any desired composition, preferably having a content of from 20 to 100% by weight of silicon dioxide, silicon dioxide-titanium(IV) oxide mixed oxides having any desired composition, preferably having a content of from 20 to 100% by weight of silicon dioxide; and insoluble or sparingly soluble ionic and mineral compounds, e.g. calcium carbonates, barium sulfates, iron(II) sulfides such as pyrites, calcium silicates, aluminosilicates such as layered aluminosilicates, e.g. clays, such as bentonites, montmorillonites and hectorites, which may also be organically modified; micronized minerals and crushed rocks; and sparingly soluble nonionic compounds, such as boron nitrides, silicon nitrides, or silicon carbides.

Metal oxides having BET specific surface areas greater than 10 m$^2$/g, such as metal oxides prepared in high temperature processes, for example pyrogenic metal oxides prepared in flame processes, metal oxides prepared in plasma processes, metal oxides prepared in hot-wall reactors, and metal oxides prepared by laser methods, are preferred.

Silicic acids having BET specific surface areas greater than 10 m$^2$/g are preferred, more preferably synthetic silicic acids, for example, silicic acids prepared by a wet chemical method such as silica sols and silica gels, pyrogenic silicic acids prepared in flame processes, silicon dioxides prepared in plasma processes, silicon dioxides prepared in hot-wall reactors, silicon dioxides prepared by laser methods, preferably pyrogenic silicic acid prepared at, preferably, temperatures of more than 1000° C.

Particle types of the dispersion can also be selected from any desired mixtures of the abovementioned particle types. It is preferable that the dispersion contains at least two particle types, it being possible on the one hand to select, in each case, silicic acid and, on the other hand, in each case, a particle type from the group consisting of aluminum oxide, boron oxide, zirconium oxide, titanium oxide, zinc oxide, cerium oxide and iron oxide, it also being possible for a plurality of particle types from this group to be present.

It is particularly preferable that at least one second particle type is a metal oxide, for example an aluminum oxide, zirconium oxide or titanium dioxide, such as metal oxides prepared by a wet chemical method, pyrogenic metal oxides prepared in flame processes, metal oxides prepared in plasma processes, metal oxides prepared in hot-wall reactors, and metal oxides prepared by laser methods, most preferably pyrogenic aluminum oxides, zirconium oxides and titanium dioxides.

The chemically different particle types preferably have a mean primary particle size d-PP of from 0.5 to 1000 nm, more preferably from 5 to 100 nm, and most preferably from 5 to 50 nm. Suitable methods of measurement for this purpose include the determination of the BET surface areas and of the material density: d-PP=6/(BET·material density); transmission electron microscopy or high-resolution scanning electron microscopy, for example in the field emission mode, and ultrasound spectroscopy in a measuring range from 1 to 100 MHz.

The chemically different particle types preferably have a mean secondary structure or aggregate particle size d-Aggr of from 50 to 5000 nm, preferably from 100 to 500 nm, measured as a hydrodynamic diameter. Suitable methods of measurement for this purpose are, for example, dynamic light scattering or photocorrelation spectroscopy, and, for measurement of concentrations >0.01% by weight of solids, measurement can be carried out as back scattering or corrected by means of cross-correlation against multiple scattering.

The particle types preferably have a mean tertiary or agglomerate particle size d-Aggl of >100 nm, measured as a geometric diameter.

Suitable methods of measurement for this purpose are, for example, laser light diffraction.

The particle types preferably have a specific surface area of from 1 to 1000 m$^2$/g, more preferably from 10 to 500 m$^2$/g, and most preferably from 100 to 300 m$^2$/g, measured by the BET method according to DIN 66131 and 66132.

The particle types preferably have a fractal surface dimension $D_s$ of less than or equal to 2.3, more preferably less than or equal to 2.1, and most preferably from 1.95 to 2.05, the fractal surface dimension $D_s$ here being defined as: particle surface area is proportional to the particle radius R to the power of $D_s$.

The particle types preferably have a fractal mass dimension $D_m$ of less than or equal to 2.8, more preferably equal to or less than 2.7, and most preferably from 2.4 to 2.6. The fractal mass dimension $D_m$ here is defined as: particle mass is proportional to the particle radius R to the power of $D_m$.

The BET specific surface areas of the particle types may be identical or different but are preferably different; the specific surface area of at least one particle type is most preferably greater than that of another particle type by a factor of 2. Likewise, the mean particle sizes of the particle types may be identical or different but are preferably different; the mean particle size of at least one particle type is preferably less than that of another particle type by a factor of 2, most preferably by a factor of 5.

It is also possible to use hydrophilic silicic acids which are freshly prepared and, for example, are obtained directly from the flame, and those which have been stored or already commercially packed. It is also possible to use silicic acids which have been rendered water repellent or have been silylated, for example commercial silicic acids. Uncompacted silicic acids having bulk densities of less than 60 g/l, as well as compacted silicic acids having bulk densities greater than 60 g/l, may be used. Mixtures of different silicic acids may be used, for example mixtures of silicic acids having different BET surface areas, or mixtures of silicic acids having different degrees of water repellency or different degrees of silylation.

In a preferred embodiment, the at least two particle types are firstly in each case hydrophilic metal oxides and secondly in each case particle types which are selected from the surface-modified metal oxides, the surface-modified metal oxides preferably being silylated metal oxides modified with organosilicon compounds, most preferably silylated pyrogenic metal oxides.

In a particularly preferred embodiment, the at least two particle types are firstly in each case hydrophilic silicic acid and secondly in each case particle types which are selected from the surface-modified silicic acids, the surface-modified silicic acids preferably being silylated silicic acids modified with organosilicon compounds, most preferably silylated pyrogenic silicic acids.

Organosilicon compounds, preferably used for the silylation of particles include:

(i) organosilanes or organosilazanes of the formula

$$R^1_d SiY_{4-d} \qquad (I)$$

and/or the partial hydrolysis products thereof, in which

R$^1$ may be identical or different and are monovalent, optionally substituted hydrocarbon radicals having 1 to 24 carbon atoms optionally interrupted by (non-adjacent) oxygen atoms, d is 1, 2 or 3 and Y may be identical or different and are halogen, monovalent Si—N-bonded nitrogen radicals to which a further silyl radical may be bonded, —OR$^2$ or —OC(O)OR$^2$ in which R$^2$ is a hydrogen atom or a monovalent, optionally substituted hydrocarbon radical having 1-8 carbon atoms which may be interrupted by oxygen atoms, and (ii) linear, branched or cyclic organosiloxanes comprising units of the formula

$$R^3_e(OR^4)_f SiO_{(4-e-f)/2} \qquad (II)$$

in which

R$^3$ are identical or different and have one of the meanings stated above for R$^1$, R$^4$ are identical or different and have a meaning stated for R$^2$, e is 0, 1, 2 or 3, and f is 0, 1, 2 or 3, with the proviso that the sum e+f is $\geq 3$, or mixtures of (i) and (ii).

The organosilicon compounds which can be used for the silylation of the solid particles may be, for example, mixtures of silanes or silazanes of the formula (I), those comprising methylchlorosilanes on the one hand or alkoxysilanes and optionally disilazanes on the other hand being preferred.

Examples of R$^1$ are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; alkenyl radicals such as the vinyl and the allyl radical; cycloalkyl radicals such as cyclopentyl, cyclohexyl and cycloheptyl radicals and methylcyclohexyl radicals; aryl radicals such as the phenyl, naphthyl, anthryl and phenanthryl radicals; alkaryl radicals such as o-, m- and p-tolyl radicals, xylyl radicals and ethylphenyl radicals; and aralkyl radicals such as the benzyl radical and the alpha- and the beta-phenylethyl radicals.

Examples of substituted hydrocarbon radicals R are halogenated radicals such as the 3-chloropropyl radical, the 3,3,3-trifluoropropyl radical, chlorophenyl radicals, hexafluoropropyl radicals such as the 1-trifluoromethyl-2,2,2-trifluoroethyl radical; the 2-(perfluorohexyl)ethyl radical, the 1,1,2,2-tetrafluoroethoxypropyl radical, the 1-trifluoromethyl-2,2,2-trifluoroethoxypropyl radical, the perfluoroisopropoxyethyl radical, the perfluoroisopropoxypropyl radical; radicals substituted by amino groups such as the N-(2-aminoethyl)-3-aminopropyl radical, the 3-aminopropyl radical, the 3-(cyclohexylamino)propyl radical, the aminomethyl radical, the cyclohexylaminomethyl radical and the diethylaminomethyl radical; ether-functional radicals such as the 3-methoxypropyl radical, the methoxymethyl radical, the 3-ethoxypropyl radical and the acetoxymethyl radical; cyano-functional radicals such as the 2-cyanoethyl radical; ester-functional radicals such as the methacryloyloxypropyl radical; epoxy-functional radicals such as the glycidyloxypropyl radical, and sulfur-functional radicals such as the 3-mercaptopropyl radical. The methyl, octyl and vinyl radicals are preferred, and the methyl radical is particularly preferred.

$R^2$ is preferably a methyl or ethyl radical.

Examples of organosilanes of the formula (I) are alkylchlorosilanes such as methyltrichlorosilane, dimethyldichlorosilane, trimethylchlorosilane, octylmethyldichlorosilane, octyltrichlorosilane, octadecylmethyldichlorosilane and octadecyltrichlorosilane; methylmethoxysilanes such as methyltrimethoxysilane, dimethyldimethoxysilane and trimethylmethoxysilane; methylethoxysilanes such as methyltriethoxysilane, dimethyldiethoxysilane and trimethylethoxysilane; methylacetoxysilanes such as methyltriacetoxysilane, dimethyldiacetoxysilane and trimethylacetoxysilane; vinylsilanes such as vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane and vinyldimethylethoxysilane; disilazanes such as hexamethyldisilazane, divinyltetramethyldisilazane and bis(3,3-trifluoropropyl)tetramethyldisilazane; cyclosilazanes such as octamethylcyclotetrasilazane; and silanols such as trimethylsilanol. Methyltrichlorosilane, dimethyldichlorosilane and trimethylchlorosilane or hexamethyldisilazane are preferred.

Examples of organosiloxanes of the formula (II) are linear or cyclic dialkylsiloxanes having an average number of dialkylsilyloxy units of more than 3. The dialkylsiloxanes are preferably dimethylsiloxanes. Linear polydimethylsiloxanes having the following terminal groups are preferred: trimethylsiloxy, dimethylhydroxysiloxy, dimethylchlorosiloxy, methyldichlorosiloxy, dimethylmethoxysiloxy, methyldimethoxysiloxy, dimethylethoxysiloxy, methyldiethoxysiloxy, dimethylacetoxysiloxy, and methyldiacetoxysiloxy. Ttrimethylsilyloxy or dimethylhydroxysilyloxy terminal groups are particularly preferred. The polydimethylsiloxanes preferably have a viscosity at 25° C. of from 2 to 100 mPa·s.

Further examples of organosiloxanes are silicone resins, in particular those which contain methyl groups as the alkyl group, more preferably those which contain $R^1{}_3SiO_{1/2}$ and $SiO_{4/2}$ units or those which contain $R^1SiO_{3/2}$ and optionally $R^1{}_2SiO_{2/2}$ units, $R^1$ having one of the abovementioned meanings. Silicone resins comprising units of the formula (III) preferably have a viscosity at 25° C. of from 500 to 5000 $mm^2/s$.

Preferred silicone resins having a viscosity of more than 1000 $mm^2/s$ at 25° C. are those which can be dissolved in a solvent which can be easily handled technically, preferably, alcohols such as methanol, ethanol or isopropanol, ethers such as diethyl ether or tetrahydrofuran, siloxanes such as hexamethyldisiloxane, alkanes, such as cyclohexane or n-octane, aromatics, such as toluene or xylene. The resin solutions preferably have a concentration of more than 10% by weight and with a viscosity of less than 1000 $mm^2/s$ at a temperature of 25° C. and atmospheric pressure.

Preferred among the solid organosiloxanes are those which dissolve in a solvent which can be handled technically (as defined above) in a concentration of more than 10% by weight and with a viscosity of the mixture of less than 1000 $mm^2/s$ at a temperature of 25° C.

The substances used for the preparation of the silylated silicic acids used according to the invention may be in each case an individual type as well as a mixture of at least two types of such substances.

A preferred process for the preparation of the silylated silicic acids used according to the invention is to be described below with reference to the preferred starting material silicic acid, pyrogenic silicic acids being particularly preferably used.

The imparting of water repellency and silylation which are preferably carried out for the preparation of the silicic acids which may be used according to the invention can be carried out as a batchwise reaction, i.e. by the batch process, or as a continuous reaction, the continuous reaction being preferred.

The imparting of water repellency and silylation can take place in one step or in 2 or 3 successive steps. This means that loading (physiosorption of the silylating agent) can be effected upstream of the reaction and preferably a purification step can be effected downstream of the reaction. 3 successive steps are preferred: (1) loading—(2) reaction—(3) purification. The loading temperature is preferably from −30 to 350° C., more preferably from 20 to 120° C. The reaction temperatures preferably range from 50 to 400° C., more preferably from 50 to 330° C. The reaction times are preferably from 1 minute to 24 hours, more preferably from 30 minutes to 4 hours. The reaction pressure is preferably in the region of atmospheric pressure, i.e. from 900 to 1100 hPa, and the purification temperature preferably ranges from 100 to 400° C.

Effective agitation and thorough mixing of silicic acid and silylating agent during steps (1) loading, (2) reaction and (3) purification are required. It is preferably effected by mechanical or gas-supported fluidization. Gas-supported fluidization can be effected by all inert gases which do not lead to secondary reactions, degradation reactions, oxidation processes and flame and explosion phenomena. The superficial gas velocity is preferably from 0.05 to 5 cm/s, more preferably from 0.05 to 1 cm/s. Mechanical fluidization can be effected by means of paddle stirrers, anchor stirrers and other suitable stirring elements. In a particularly preferred embodiment, only the amount of gas which is sufficient for maintaining a low-oxygen atmosphere is fed in, preferably less than 5% by volume, and the fluidization is then effected purely mechanically.

The reaction is preferably carried out in an atmosphere which does not lead to oxidation of the silylated silicic acid, i.e. preferably less than 10% by volume of oxygen, more preferably less than 2.5% by volume, the best results being obtained with less than 1% by volume of oxygen.

The silylating agents are effectively introduced into the silicic acid. If the silylating agents are liquid compounds at the application temperature, effective spraying techniques are preferably used. Spraying in airless high-pressure nozzles under pressure (from 5 to 20 bar), spraying in binary nozzles under pressure (gas and liquid from 2 to 20 bar), very fine distribution by means of atomizers, etc, may all be used.

The silylating agent is preferably fed in as a finely divided aerosol, the aerosol preferably having a rate of fall of from 0.1 to 20 cm/s and a drop size with an aerodynamic equivalent diameter of from 5 to 25 μm. Optionally, protic solvents can be added, such as liquid or vaporizable alcohols or water; typical alcohols are isopropanol, ethanol and methanol. Mixtures of the abovementioned protic solvents may also be added. Preferably, no protic solvents are added.

Optionally, acidic or basic catalysts can also be added. These catalysts may have a basic character, in the context of a Lewis base or of a Brönsted base such as ammonia, or an acidic character, in the context of a Lewis acid or of a Brönsted acid such as hydrogen chloride. If catalysts are used, they are preferably used in traces, i.e. less than 1000 ppm. Most preferably, no catalysts are added.

The purification step comprises agitation, slow agitation and slight mixing being preferred, and furthermore preferably comprises an increased gas feed, corresponding to a superficial gas velocity of from 0.001 to 10 cm/s. In addition, the purification step may comprise mixing by means of mechanical stirring elements. The stirring elements are adjusted and moved in such a way that mixing and fluidization, but not complete vortexing, preferably occur. Methods for mechanical compaction, for example, press rolls, ball mills, edge mills, screw compressors and briquetting means, can also be used during the silylation step.

Methods for deagglomeration of the silicic acid, such as pinned-disk mills or apparatuses for milling and classification, and/or methods for mechanical compaction of the silicic acid, such as, for example, press rolls, or compaction by extraction of the air or gas content by suitable vacuum methods, or other methods for mechanical compaction, such as, for example, press mills, ball mills, edge mills, screw compressors and briquetting means, can additionally be used before, during or after the silylation step.

The silylated silicic acids used according to the invention preferably have a BET surface area of from 170 to 230 m²/g and a carbon content of from 0.1 to 3 percent by weight, more preferably from 0.1 to 1.5 percent by weight, and yet more preferably from 0.1 to 1 percent by weight, and most preferably from 0.1 to 0.7 percent by weight, preferably determinable in each case by elemental analysis.

If hydrophobic and highly hydrophobic silicic acids are used as particle types, liquid having a surface tension lower than that of water, i.e. <72.5 mN/m, are preferably used for reasons relating to wettability, for example mixtures of water with an alcohol such as methanol, ethanol or isopropanol.

The dispersions according to the invention preferably contain one particle type in an amount of more than 50% by weight, based on the solids content of the dispersion. At least one further particle type or a plurality of particle types is/are preferably present in an amount of from 0.001% by weight to 10% by weight, more preferably from 0.01% by weight to 10% by weight, yet more preferably 0.1 to 5% by weight, and most preferably 0.2 to 2% by weight, based on the solids content of the dispersion.

The dispersions according to the invention preferably contain a silicic acid, more preferably pyrogenic silicic acid, in an amount of more than 50% by weight, based on the solids content of the dispersion; preferably, at least one further particle type or a plurality of particle types, preferably in an amount of from 0.001% by weight to 10% by weight, more preferably from 0.01% by weight to 10% by weight, yet more preferably 0.1 to 5% by weight, and most preferably 0.2 to 2% by weight, based on the solids content of the dispersion.

The aqueous dispersions according to the invention may optionally contain other additives, for example, mineral acids such as phosphoric acid; organic acids such as malic acid, citric acid; propionic acid; inorganic bases such as potassium hydroxide or sodium hydroxide or ammonia; organic bases such as triethanolamine; polymers such as polyethylene glycol; or polypropylene glycol; surfactants such as anionic surfactants, for example dodecylsulfonic acid, cationic surfactants such as cetylpyridinium chloride, or neutral surfactants such as Triton X100; and polyelectrolytes such as polycarboxylic acids and the salts thereof, polyacrylic acids and the salts thereof, or polydiallyldimethylammonium chlorides.

The content of organic additives in the aqueous dispersion according to the invention is preferably less than 5% by weight, more preferably less than 1% by weight, yet more preferably less than 0.1% by weight, and most preferably less than 0.01% by weight, based on the total dispersion. It is especially preferable that no organic additives are added to the dispersion according to the invention. Most preferably, the dispersions contain no measurable organic additives.

The content of organic and inorganic salts or electrolytes such as HCl, NaCl, KCl, Fe(III)Cl$_3$, AlCl$_3$, Al$_2$(SO$_4$)$_3$ or Na$_2$SO$_4$, in the aqueous dispersions is preferably less than 5% by weight, more preferably less than 1% by weight, yet more preferably less than 0.1% by weight, and most preferably less than 0.01% by weight. Most preferably, no organic and inorganic salts are added to the dispersions. The dispersions preferably contain no measurable organic and inorganic salts.

The conductivity of the aqueous dispersions is preferably less than 100 mS/cm, more preferably less than 10 mS/cm, yet more preferably less than 1 mS/cm, still more preferably less than 0.1 mS/cm, and most preferably less than 0.01 mS/cm. Especially preferred are dispersions having a conductivity of less than 0.005 mS/cm.

The fluid phase of the dispersion comprises liquids, preferably those which have a low viscosity, and more preferably, those having viscosities of less than 100 mPa·s at 25° C., such as water, and other polar protic liquid media; alcohols such as methanol, ethanol and isopropanol; di- and polyols; such as glycols, for example, ethylene glycol and propylene glycol; polyglycols such as liquid polyethylene glycols and polypropylene glycols; or glycerol; and polar aprotic liquid media such as ethers, for example, tetrahydrofuran; ketones such as acetone and isobutyl ketone; esters such as ethyl acetate; amides such as formamides, for example, dimethylformamide; sulfoxides such as dimethyl sulfoxide; and nonpolar liquid media such as alkanes, for example, cyclohexane; or aromatics such as toluene, and homogeneous mixtures thereof. Water is particularly preferred.

The dispersion according to the invention preferably contains the abovementioned metal oxides.

The invention furthermore relates to a process for preparing silicic acid dispersions, wherein water and at least one particle type which differs chemically from the silicic acid are initially introduced and the silicic acid is then added with application of shear energy.

For preparing the dispersions according to the invention, the particle types can be added to the liquid and are distributed by wetting, or by shaking, such as with a tumbler mixer, or a high-speed mixer, or by stirring. At low particle concentrations, simple stirring is generally sufficient for incorporating the particles into the liquid. The incorporation and dispersing of the particles in the liquid at a very high shear gradient is preferred, especially in the case of high particle concentrations. The dispersing can be effected in customary mixing apparatuses which are suitable for preparing emulsions or dispersions and provide a sufficiently high input of shear energy, such as, for example, high-speed stator-rotor stirring apparatuses, such as those, for example, according to Prof. P. Willems, known under the registered trademark "Ultra-Turrax", or other stator-rotor systems, known under the tradenames Kady, Unimix, Koruma, Cavitron, Sonotron, Netzsch or Ystral. Other methods involve ball mills, such as, for example, Dyno-Mill from WAB, Switzerland. Further methods involve high-speed stirrers such as paddle stirrers or bar-type stirrers, dissolvers, for example having circumferential speeds of 1-50 m/s, such as disk dissolvers, for example from Getzmann, or mixing systems, such as planetary dissolvers, bar-type dissolvers or other combined units comprising dissolver and stirrer systems. Other suitable systems are extruders or kneaders. Dispersion can be effected by both batchwise and by continuous processes.

Particularly suitable are systems which initially achieve wetting and incorporation of the silicic acid in the liquid by means of effective stirring elements, for example in a closed container or vessel, and disperse the silicic acid at a very high shear gradient in a second step. This can be effected by means of a dispersing system in the first container, or by circulation by means of pumping from the container through an external pipeline which contains a dispersing element, preferably with closed recycling back into the container. By partial recycling and partial continuous removal, this process can be made continuous.

The use of ultrasound in the range from 5 kHz to 500 kHz, preferably from 10 kHz to 100 kHz, most preferably from 15 kHz to 50 kHz, is particularly suitable for dispersing the silicic acid in the dispersion. The ultrasonic dispersing can be effected continuously or batchwise, and by means of individual ultrasound generators such as ultrasonic tips, or in flow-through systems which contain one or more ultrasound generators such as ultrasonic fingers and generators, or ultrasonic flow-through cells, or ultrasonic systems, such as, or analogous to, those offered by Sonorex/Bandelin.

As indicated, the process for dispersing particles in a liquid can be carried out batchwise as well as continuously. Of course, the dispersions can also be produced in other manners. However, it has been found that the procedure is to some degree critical and not all methods of preparation give dispersions. The processes according to the invention have the advantage that they are very simple to carry out, and aqueous dispersions having very high solids contents can be prepared.

In the silicic acid dispersion according to the invention which contains metal oxide, metal oxide is present, measured as metal, preferably in an amount from 0.00001% by weight to 8% by weight of metal, more preferably from 0.0001% by weight to 8% by weight of metal, yet more preferably from 0.001 to 5% by weight, still more preferably 0.1 to 5% by weight, and most preferably 0.5 to 5% by weight of metal, metal always being calculated as pure metal in the metal-containing dispersion, based on the total dispersion.

In a particular embodiment, a hydrophilic pyrogenic silicic acid which is prepared under anhydrous conditions is used as a starting material of the surface treatment with a metal compound. Here, anhydrous is to be understood as meaning that no additional water, either in liquid or in vapor form, is fed to the process, either in the hydrothermal preparation process or in the further steps of the process, such as cooling, purification and storage, up to the prepared and purified, packed and ready-to-ship product. In any case, not more than 5% by weight of water, based on the total weight of the silicic acid, is added; preferably, as little water as possible, and most preferably, no water at all, is added.

Mixtures of different silicic acids may be used, for example mixtures of silicic acids having different BET surface areas, or mixtures of silicic acids having different degrees of water repellency or silylation.

The invention furthermore relates to a method of using the aqueous dispersion for thickening and strengthening aqueous coating systems, adhesives, sealants and composite materials, for chemical mechanical planarization and polishing of electronic and optical components, for the coating of papers and films and for producing components for preventing corrosion of metals.

A further application of the invention is an aqueous dispersion suitable for the coating of recording media, in particular those papers which are used in contactless printing processes. Examples are papers for inkjet printers and in particular those papers having high gloss.

A further application of the invention is a recording medium, for example a paper or film, suitable for printing on by means of inkjet printers, in particular a paper having a high gloss, which is produced by coating with the dispersion according to the invention.

A further application of the invention is an aqueous dispersion suitable for use in the coating of surfaces, such as mineral substrates, such as metals, e.g. steel or iron, for example with the aim of preventing corrosion.

A further application of the invention is an aqueous dispersion suitable for use in the production of paints and finishes, synthetic resins, adhesives and sealants, in particular those which are water-based.

A further application of the invention is an aqueous dispersion suitable for the production of paints and finishes, synthetic resins, adhesives and sealants, in particular for establishing and controlling rheology.

The aqueous dispersion according to the invention is suitable for the production of paints and finishes, synthetic resins, adhesives and sealants, in particular for improving the mechanical properties thereof, such as, for example, for improving the scratch resistance.

The advantages of the present invention are that surprisingly a person skilled in the art could in no way foresee that solids dispersions consisting of two or more chemically different particle types, water and optionally further substances would remedy the disadvantages of the prior art.

Surprisingly, it has now been found that, with the use of at least two chemically different particle types which differ, for example, in their isoelectric point, it is possible to prepare dispersions having very high solids contents, with excellent stability to gelling and sedimentation even after a long storage time.

Surprisingly, it has now been found that, by using at least two chemically different particle types having a diameter of less than 100 μm, it is possible to prepare dispersions having very high solids contents, with excellent stability to gelling and sedimentation, even after a long storage time.

EXAMPLES

Example 1

In a batchwise apparatus, 0.5 kg of pyrogenically prepared aluminum oxide having a specific surface area of 100 $m^2/g$ and an $Al_2O_3$ content of more than 99.6% by weight (measured on the material ignited at 1000° C. for 4 hours) and 170 kg of hydrophilic silicic acid having a specific surface area of 300 m²/g (obtainable under the name WACKER HDK T30 from Wacker-Chemie GmbH, Burghausen, Germany), the specific surface area being measured in each case by the BET method according to DIN 66131 and 66132, are added in small steps at a temperature of 25° C. to 830 kg of water and dispersed using a Koruma rotor-stator dispersing unit over the course of 8 hours.

A low-viscosity whitish aqueous dispersion having a solids content of 17% by weight and a pH of pH 3.8 forms. The dispersion is stable to sedimentation and gelling for more than one year. At a shear gradient of 100 l/s and a temperature of 25° C., measured using a cone-and-plate rotation viscometer from Haake, RheoStress 600, the dispersion has a viscosity of 120 mPa·s. The dispersion has a zeta potential of −25 mV, measured by means of electroacoustics using a DT1200 apparatus from Dispersion Technologies. The dispersion has a conductivity of 0.05 mS/cm.

Example 2

In a batchwise apparatus, 0.4 g of pyrogenically prepared aluminum oxide having a specific surface area of 100 m²/g and an $Al_2O_3$ content of more than 99.6% by weight (measured on the material ignited at 1000° C. for 4 hours) and 240 g of hydrophilic silicic acid having a specific surface area of 200 m²/g (obtainable under the name WACKER HDK N20 from Wacker-Chemie GmbH, Burghausen, Germany) are added in small steps at a temperature of 25° C. to 1760 kg of water and dispersed using a Unimix rotor-stator dispersing unit, Unimix, from Ekato, Germany, over the course of 12 hours.

A low-viscosity whitish aqueous dispersion having a solids content of 12% by weight and a pH of pH 3.9 forms. The dispersion is stable to sedimentation and gelling for more than one year. At a shear gradient of 100 l/s and a temperature of 25° C., measured using a cone-and-plate rotation viscometer from Haake, RheoStress 600, the dispersion has a viscosity of 90 mPa·s. The dispersion has a zeta potential of −22 mV, measured by means of electroacoustics using a DT1200 apparatus from Dispersion Technologies. The dispersion has a conductivity of 0.04 mS/cm.

The stability to sedimentation is documented by measurement using a centrifuge controlled by optical transmission, a Luminofuge® apparatus, cf. FIG. 1 (reference not according to the invention) and FIG. 2 (example (2) according to the invention).

Example 3

In a batchwise apparatus, 0.5 kg of pyrogenically prepared aluminum oxide having a specific surface area of 100 m²/g and an $Al_2O_3$ content of more than 99.6% by weight (measured on the material ignited at 1000° C. for 4 hours) and 170 kg of hydrophilic silicic acid having a specific surface area of 150 m²/g (obtainable under the name WACKER HDK V15 from Wacker-Chemie GmbH, Burghausen, Germany) are added in small steps at a temperature of 25° C. to 830 kg of water and dispersed using a Koruma rotor-stator dispersing unit over the course of 8 hours.

A low-viscosity whitish aqueous dispersion having a solids content of 15% by weight and a pH of pH 3.9 forms. The dispersion is stable to sedimentation and gelling for more than one year. At a shear gradient of 100 l/s and a temperature of 25° C., measured using a cone-and-plate rotation viscometer from Haake, RheoStress 600, the dispersion has a viscosity of 80 mPa·s. The dispersion has a zeta potential of −21 mV, measured by means of electroacoustics using a DT1200 apparatus from Dispersion Technologies. The dispersion has a conductivity of 0.08 mS/cm.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An aqueous dispersion which contains at least two chemically different particle types having a diameter on average of less than 100 μm, wherein a first particle type consists of silica, and at least one second particle type is selected from the group consisting of organic resin particles, metal oxide particles other than silica particles, insoluble or poorly soluble ionic particles, and insoluble or poorly soluble mineral particles, wherein the silica particles are present in an amount of at least 50 weight percent based on the total weight of the solids content of the dispersion, which has a viscosity of less than 100 mPa·s measured at 25° C.

2. The aqueous dispersion of claim 1, wherein the isoelectric points of two particle types differ by greater than one pH unit.

3. The aqueous dispersion of claim 1, wherein at least one second particle is selected from the group consisting of aluminum oxide, boron oxide, zirconium oxide, titanium oxide, zinc oxide, cerium oxide and iron oxide.

4. The aqueous dispersion of claim 1, wherein the silica is pyrogenic silica.

5. The aqueous dispersion of claim 1, wherein organic additives are present at less than 0.1% by weight.

6. The aqueous dispersion of claim 1 which has a conductivity of less than 0.1 mS/cm.

7. The aqueous dispersion of claim 1 which has a conductivity of less than 0.01 mS/cm.

8. The aqueous dispersion of claim 1 which has a conductivity of less than 0.005 mS/cm.

9. The aqueous dispersion of claim 1, wherein organic additives are present in an amount of less than 1% by weight relative to the weight of the aqueous dispersion.

10. The aqueous dispersion of claim 1, wherein the conductivity of the aqueous dispersion is less than 1 mS/cm.

11. The aqueous dispersion of claim 1, wherein the second particle type is a metal oxide, present in an amount of 0.1 to 5% by weight calculated as the metal, this weight percent relative to the particle solids content of the aqueous dispersion.

12. The aqueous dispersion of claim 1, wherein a second particle type consists of aluminum oxide.

13. The aqueous dispersion of claim 1, wherein the isoelectric points of two particle types differ by greater than 2.5 pH units.

14. The aqueous dispersion of claim 1, wherein the isoelectric points of two particle types differ by greater than four pH units.

15. The aqueous dispersion of claim 1, wherein the silica particles have a BET surface area of 100²/g to 1000 m²/g.

16. The dispersion of claim 1, which is free of organic additives.

* * * * *

UNITED STATES PATENT AND TRADEMARK OFFICE
CERTIFICATE OF CORRECTION

| | | |
|---|---|---|
| PATENT NO. | : 7,901,502 B2 | Page 1 of 1 |
| APPLICATION NO. | : 11/011303 | |
| DATED | : March 8, 2011 | |
| INVENTOR(S) | : Herbert Barthel et al. | |

It is certified that error appears in the above-identified patent and that said Letters Patent is hereby corrected as shown below:

Column 12, Line 60, Claim 15:

After "surface area of" delete "$100^2/g$"
And insert -- $100 \text{ m}^2/g$ --.

Signed and Sealed this
Twenty-fourth Day of May, 2011

David J. Kappos
*Director of the United States Patent and Trademark Office*